United States Patent
Kani et al.

(10) Patent No.: US 9,252,443 B2
(45) Date of Patent: Feb. 2, 2016

(54) HYDROGEN GENERATION APPARATUS, FUEL CELL SYSTEM, AND HYDROGEN GENERATION APPARATUS OPERATION METHOD

(75) Inventors: Yukimune Kani, Osaka (JP); Hidenobu Wakita, Kyoto (JP); Seiji Fujihara, Osaka (JP); Tomoyuki Nakajima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 909 days.

(21) Appl. No.: 13/497,730

(22) PCT Filed: Dec. 24, 2010

(86) PCT No.: PCT/JP2010/007520
§ 371 (c)(1),
(2), (4) Date: Mar. 22, 2012

(87) PCT Pub. No.: WO2011/077752
PCT Pub. Date: Jun. 30, 2011

(65) Prior Publication Data
US 2012/0178006 A1 Jul. 12, 2012

(30) Foreign Application Priority Data
Dec. 25, 2009 (JP) ................. 2009-294155

(51) Int. Cl.
*H01M 8/02* (2006.01)
*H01M 8/06* (2006.01)
*C01B 3/38* (2006.01)

(52) U.S. Cl.
CPC ............ *H01M 8/0618* (2013.01); *C01B 3/384* (2013.01); *C01B 2203/0233* (2013.01);
(Continued)

(58) Field of Classification Search
None
See application file for complete search history.

(56) References Cited

U.S. PATENT DOCUMENTS

| 2001/0002248 | A1 | 5/2001 | Ukai et al. |
| 2008/0038603 | A1* | 2/2008 | Lee et al. ............... 429/22 |

(Continued)

FOREIGN PATENT DOCUMENTS

| JP | 01-275697 A | 11/1989 |
| JP | 05-114414 A | 5/1993 |

(Continued)

OTHER PUBLICATIONS

International Search Report issued in International Patent Application No. PCT/JP2010/007520, dated Mar. 1, 2011.
Preliminary Report on Patentability issued in International Patent Application No. PCT/JP2010/007520, dated Oct. 24, 2011.

*Primary Examiner* — Tracy Dove
(74) *Attorney, Agent, or Firm* — McDermott Will & Emery LLP (57) ABSTRACT

A hydrogen generation apparatus (150) includes: a first desulfurizer (13) configured to remove, through adsorption, a sulfur compound in a raw material gas that is to be supplied to a reformer; a second desulfurizer (21) configured to hydrodesulfurize a sulfur compound in the raw material gas that is to be supplied to the reformer; a first passage (16) through which the raw material gas is supplied to the reformer through the first desulfurizer (13); a second passage (17) through which the raw material gas is supplied to the reformer through the second desulfurizer (21), without passing through the first desulfurizer (13); a switch configured to switch a passage through which the raw material gas flows between the first passage (16) and the second passage (17); and a controller. The controller controls the switch such that the raw material gas flows through the first passage (16) in at least one of a pressure compensation operation and a raw material gas purge operation, the pressure compensation operation being an operation of supplying the raw material gas in order to compensate for an internal pressure drop that occurs after an operation of generating a hydrogen-containing gas is stopped, and the raw material gas purge operation being an operation of purging the inside of the hydrogen generation apparatus with the raw material gas.

9 Claims, 7 Drawing Sheets

(52) U.S. Cl.
CPC .. *C01B 2203/0283* (2013.01); *C01B 2203/044* (2013.01); *C01B 2203/047* (2013.01); *C01B 2203/066* (2013.01); *C01B 2203/0811* (2013.01); *C01B 2203/127* (2013.01); *C01B 2203/1258* (2013.01); *C01B 2203/148* (2013.01); *C01B 2203/169* (2013.01); *Y02E 60/50* (2013.01)

(56) References Cited

U.S. PATENT DOCUMENTS

2009/0087701 A1    4/2009  Kuwaba
2012/0040256 A1*   2/2012  Kani et al. .................... 429/410

FOREIGN PATENT DOCUMENTS

| JP | 2002-093447 A | 3/2002 |
| JP | 2002-151124 A | 5/2002 |
| JP | 2004-228016 A | 8/2004 |
| JP | 2006111766 A * | 4/2006 |
| JP | 2007-290942 A | 11/2007 |
| JP | 4130603 B2 | 8/2008 |
| JP | 4264791 B2 | 5/2009 |
| JP | 2009-249203 A | 10/2009 |
| WO | WO 2009061072 A1 * | 5/2009 |

* cited by examiner

HYDROGEN GENERATION APPARATUS, FUEL CELL SYSTEM, AND HYDROGEN GENERATION APPARATUS OPERATION METHOD

RELATED APPLICATIONS

This application is the U.S. National Phase under 35 U.S.C. §371 of International Application No. PCT/JP2010/007520, filed on Dec. 24, 2010, which in turn claims the benefit of Japanese Application No. 2009-294155, filed on Dec. 25, 2009, the disclosures of which Applications are incorporated by reference herein.

TECHNICAL FIELD

The present invention relates to a hydrogen generation apparatus configured to generate a hydrogen-containing gas from, for example, a raw material gas containing an organic compound of which constituent elements are at least carbon and hydrogen, and to a fuel cell system configured to generate electric power by using the hydrogen-containing gas generated by the hydrogen generation apparatus.

BACKGROUND ART

Fuel cells, which are capable of generating electric power with high efficiency even when they are configured as small-sized devices, have been developed as power generation systems of distributed energy sources. However, there is no general infrastructure to supply a hydrogen gas to be used as a fuel for such a fuel cell to generate electric power. For this reason, a hydrogen generation apparatus is installed together with the fuel cell. The hydrogen generation apparatus uses a raw material gas, such as city gas or propane gas supplied from an existing raw material gas infrastructure, to generate a hydrogen-containing gas through a reforming reaction between the raw material gas and water.

Such a hydrogen generation apparatus often includes: a reformer configured to cause a reforming reaction between a raw material gas and water; a shift converter configured to cause a water gas shift reaction between carbon monoxide and steam; and a CO remover configured to oxidize carbon monoxide by using an oxidant which is mainly air, for example. Each of these reactors uses a respective catalyst suitable for their reaction. For example, a Ru catalyst or a Ni catalyst is used in the reformer; a Cu—Zn catalyst is used in the shift converter; and a Ru catalyst is used in the CO remover. These reactors are used at respective suitable temperatures. Typically, the reformer is used at a temperature of approximately 600° C. to 700° C.; the shift converter is used at a temperature of approximately 350° C. to 200° C.; and the CO remover is used at a temperature of approximately 200° C. to 100° C. Electrode contamination due to CO tends to occur particularly in a solid polymer fuel cell. Therefore, a CO concentration in a hydrogen-containing gas to be supplied to a solid polymer fuel cell needs to be suppressed to several tens of vol ppm. The CO remover reduces the CO concentration by oxidizing CO.

A raw material gas such as city gas contains sulfur compounds. It is necessary to remove the sulfur compounds from the raw material gas in some way since, in particular, the sulfur compounds contaminate a reforming catalyst. In this respect, various proposal have been made including: a method of removing sulfur compounds through ordinary-temperature adsorption (see Patent Literature 1, for example); and a hydrogen generation apparatus configured to perform ordinary-temperature adsorption desulfurization at start-up and switch the desulfurization mode to hydrodesulfurization when ready to generate hydrogen (see Patent Literature 2, for example)

It is well known that when catalysts come into contact with air, oxidation occurs, causing reduced catalyst activity in varying degrees. Therefore, hydrogen generation apparatuses are designed such that when a hydrogen generation apparatus is not operating, the hydrogen generation apparatus is closed by using valves or the like. In such a manner, air is prevented from flowing into the hydrogen generation apparatus. When a hydrogen generation apparatus that is operating is stopped, a pressure drop is caused due to a temperature drop and/or a reaction. There is a proposed hydrogen generation apparatus that solves such a pressure drop. The proposed hydrogen generation apparatus compensates for such a pressure drop by supplying a raw material gas to a reformer (hereinafter, referred to as a pressure compensation operation) (see Patent Literature 3, for example). It is known that a reduction in catalyst activity is also caused by condensation of water. In this respect, there is a proposed hydrogen generation apparatus configured to purge the inside of a reformer by using a raw material gas (hereinafter, referred to as raw material gas purge), thereby preventing catalyst degradation due to dew condensation (see Patent Literature 4, for example).

Citation List

Patent Literature

PLT 1: Japanese Laid-Open Patent Application Publication No. 2004-228016
PLT 2: Japanese Laid-Open Patent Application Publication No. H1-275697
PLT 3: Japanese Laid-Open Patent Application Publication No. 2007-254251
PLT 4: Japanese Patent No. 4130603

SUMMARY OF INVENTION

Technical Problem

Assume that in a hydrogen generation apparatus employing hydrodesulfurization as disclosed in Patent Literature 2, the pressure compensation operation as disclosed in Patent Literature 3 and/or the raw material gas purge operation as disclosed in Patent Literature 4 are performed while using hydrodesulfurization. In such a case, at a time when these operations are started, it is highly likely that the internal pressure of the hydrogen generation apparatus is a negative pressure. Therefore, there is a possibility that the raw material gas that is undesulfurized flows into the hydrogen generation apparatus reversely through a hydrogen recycle line. To be more specific, in the hydrogen generation apparatus disclosed in Patent Literature 2, in order to perform desulfurization by using a hydrodesulfurizer when performing the pressure compensation operation, it is necessary that before the raw material gas that is to be supplied to a reformer flows into the hydrodesulfurizer, hydrogen is added to the raw material gas through the recycle line. In order to realize this, it is necessary to open the recycle line before opening an on-off valve to allow the reformer and a raw material gas source to be in communication with each other. In this case, however, if the internal pressure of the hydrogen generation apparatus is a negative pressure, the raw material gas that is undesulfurized flows reversely through the recycle line.

The present invention solves the above-described problems. An object of the present invention is to provide a hydrogen generation apparatus, a fuel cell system, and a hydrogen generation apparatus operation method, which suppress an undesulfurized raw material gas from flowing reversely through a recycle line when at least one of the pressure compensation operation and the raw material gas purge operation is performed in a case where hydrodesulfurization is employed.

Solution to Problem

In order to solve the above conventional problems, a hydrogen generation apparatus according to the present invention includes: a reformer configured to generate a hydrogen-containing gas by using a raw material gas; a first desulfurizer configured to remove, through adsorption, a sulfur compound in the raw material gas that is to be supplied to the reformer; a second desulfurizer configured to hydrodesulfurize a sulfur compound in the raw material gas that is to be supplied to the reformer; a first passage through which the raw material gas is supplied to the reformer through the first desulfurizer; a second passage through which the raw material gas is supplied to the reformer through the second desulfurizer, without passing through the first desulfurizer; a switch configured to switch a passage through which the raw material gas flows between the first passage and the second passage; and a controller configured to control the switch such that the raw material gas flows through the first passage in at least one of a pressure compensation operation and a raw material gas purge operation, the pressure compensation operation being an operation of supplying the raw material gas to the reformer in order to compensate for an internal pressure drop that occurs in the reformer after an operation of generating the hydrogen-containing gas is stopped, and the raw material gas purge operation being an operation of purging the inside of the reformer with the raw material gas.

Accordingly, in at least one of the pressure compensation operation and the raw material gas purge operation, the raw material gas that is undesulfurized is suppressed from flowing reversely through a recycle line as compared to a case where these operations are performed by always using hydrodesulfurization.

A fuel cell system according to the present invention includes: the above-described hydrogen generation apparatus according the present invention; and a fuel cell configured to generate electric power by using the hydrogen-containing gas that is supplied from the hydrogen generation apparatus.

A hydrogen generation apparatus operation method according to the present invention includes: hydrodesulfurizing, by a second desulfurizer, a sulfur compound in a raw material gas that is to be supplied to a reformer; generating, by the reformer, a hydrogen-containing gas by using the raw material gas, the sulfur compound of which has been hydrodesulfurized; performing at least one of a pressure compensation operation and a raw material gas purge operation, the pressure compensation operation being an operation of supplying the raw material gas to the reformer in order to compensate for an internal pressure drop that occurs in the reformer after the generating of the hydrogen-containing gas is stopped, and the raw material gas purge operation being an operation of purging the inside of the reformer with the raw material gas; and removing, through adsorption by a first desulfurizer, a sulfur compound in the raw material gas that is to be supplied to the reformer when performing at least one of the pressure compensation operation and the raw material gas purge operation.

Advantageous Effects of Invention

According to the hydrogen generation apparatus, the fuel cell system, and the hydrogen generation apparatus operation method of the present invention, in at least one of the pressure compensation operation and the raw material gas purge operation, the raw material gas that is undesulfurized is suppressed from flowing reversely through a recycle line as compared to a case where these operations are performed by always using hydrodesulfurization.

DESCRIPTION OF EMBODIMENTS

Hereinafter, embodiments of the present invention are described with reference to the drawings.

Embodiment 1

A hydrogen generation apparatus according to Embodiment 1 includes: a reformer configured to generate a hydrogen-containing gas by using a raw material gas; a first desulfurizer configured to remove, through adsorption, a sulfur compound in the raw material gas that is to be supplied to the reformer; a second desulfurizer configured to hydrodesulfurize a sulfur compound in the raw material gas that is to be supplied to the reformer; a first passage through which the raw material gas is supplied to the reformer through the first desulfurizer; a second passage through which the raw material gas is supplied to the reformer through the second desulfurizer, without passing through the first desulfurizer; a switch configured to switch a passage through which the raw material gas flows between the first passage and the second passage; and a controller configured to control the switch such that the raw material gas flows through the first passage in at least one of a pressure compensation operation and a raw material gas purge operation, the pressure compensation operation being an operation of supplying the raw material gas to the reformer in order to compensate for an internal pressure drop that occurs in the reformer after an operation of generating the hydrogen-containing gas is stopped, and the raw material gas purge operation being an operation of purging the inside of the reformer with the raw material gas.

Accordingly, in at least one of the pressure compensation operation and the raw material gas purge operation, the raw material gas that is undesulfurized is suppressed from flowing reversely through a recycle line as compared to a case where these operations are performed by always using hydrodesulfurization.

It should be noted the reformer includes a solid oxide fuel cell (SOFC) of an external reforming type or an internal reforming type.

Figure 1:
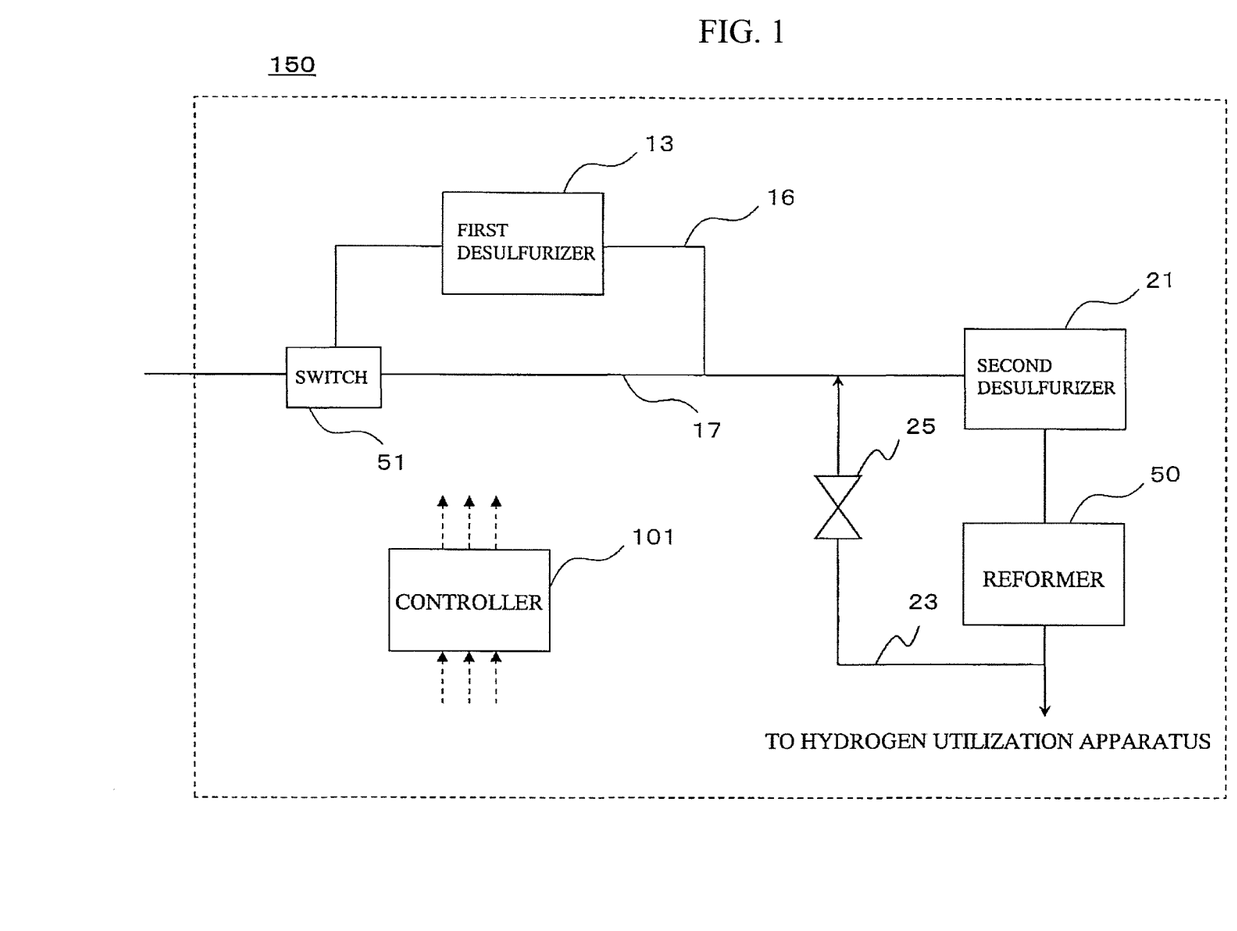
FIG. 1 is a block diagram showing an example of a schematic configuration of a hydrogen generation apparatus according to Embodiment 1.

FIG. 1 is a block diagram showing an example of a schematic configuration of the hydrogen generation apparatus according to Embodiment 1.

A hydrogen generation apparatus 150 includes: a reformer 50; a first desulfurizer 13, a second desulfurizer 21, a first passage 16, a second passage 17, a third passage 23, an on-off valve 25, a switch 51, and a controller 101.

The reformer 50 generates a hydrogen-containing gas by using a raw material gas. Specifically, in the reformer 50, a reforming reaction of the raw material gas occurs, and thereby the hydrogen-containing gas is generated.

Any type of reforming reaction may be used. For example, the reforming reaction may be a steam reforming reaction, autothermal reaction, or partial oxidation reaction. The hydrogen generation apparatus 150 includes, as necessary, devices required for the reforming reaction although they are not shown in FIG. 1. For example, if the reforming reaction is a steam reforming reaction, the hydrogen generation apparatus 150 includes: a combustor configured to heat up the reformer; an evaporator configured to generate steam; and a water supply device configured to supply water to the evaporator. If the reforming reaction is an autothermal reaction, the hydrogen generation apparatus 150 further includes an air supply device (not shown) configured to supply air to the reformer.

It should be noted that the raw material gas is, for example, city gas containing methane as a main component, natural gas, or LP gas, i.e., a gas containing an organic compound comprised of at least carbon and hydrogen. The raw material gas is supplied from a raw material gas source. The raw material gas source has a predetermined supply pressure, and is a raw material gas canister or an infrastructure to supply the raw material gas, for example.

The first desulfurizer 13 removes, through adsorption, sulfur compounds in the raw material gas that is to be supplied to the reformer.

Specifically, the first desulfurizer 13 physically adsorbs sulfur compounds in the raw material gas at ordinary temperatures. An adsorbent used in the first desulfurizer 13 is zeolite, for example.

The second desulfurizer 21 is a hydrodesulfurizer configured to hydrodesulfurize sulfur compounds in the raw material gas. The second desulfurizer 21 may be formed by packing a container with a desulfurization agent for use in hydrodesulfurization. For example, the desulfurization agent for use in hydrodesulfurization is formed of: a CoMo-based catalyst for converting sulfur compounds in the raw material gas into hydrogen sulfide; and a ZnO-based catalyst or a CuZn-based catalyst, which are adsorbents for adsorbing the converted hydrogen sulfide. However, the desulfurization agent for use in hydrodesulfurization is not limited to this example. The desulfurization agent may be solely formed of a CuZn-based catalyst.

Through the first passage 16, the raw material gas is supplied to the reformer 50 through the first desulfurizer 13. Through the second passage 17, the raw material gas is supplied to the reformer 50 through the second desulfurizer 21, without passing through the first desulfurizer 13. It should be noted that a part of the first passage 16 and a part of the second passage 17 may merge together to form a single passage.

Through the second passage 17, the raw material gas is supplied to the reformer 50 through the second desulfurizer 21, without passing through the first desulfurizer 13.

The third passage 23 is provided for allowing a part of the hydrogen-containing gas generated by the reformer 50 to be recycled and supplied to the raw material gas that is to be supplied to the second desulfurizer 21.

The on-off valve 25 opens or closes the third passage 23.

The switch 51 switches a passage through which the raw material gas flows between the first passage 16 and the second passage 17. To be specific, the switch 51 may be realized by providing an on-off valve on both of the first passage 16 and the second passage 17, or may be realized by providing a three-way valve at a branching point between the first passage 16 and the second passage 17.

The controller 101 controls the switch 51. Any device implementing control functions may be used as the controller. The controller includes an arithmetic processing unit (not shown) and a storage unit (not shown) configured to store a control program. The arithmetic processing unit is exemplified by an MPU or CPU. The storage unit is exemplified by a memory. The controller may be configured as a single controller performing centralized control, or may be configured as a group of multiple controllers performing distributed control in cooperation with each other (the same is true for controllers in other embodiments and variations).

Although not shown in FIG. 1, the hydrogen generation apparatus 150 may include at least one of a shift converter (not shown) and a CO remover (not shown). The shift converter reduces, through a shift reaction, carbon monoxide in the hydrogen-containing gas generated by the reformer, and the CO remover reduces, mainly through an oxidation reaction, carbon monoxide in the hydrogen-containing gas that has passed through the shift converter.

In the case of including the CO remover, the hydrogen generation apparatus 150 also includes an air supply device configured to supply air for use in the oxidation reaction to the hydrogen-containing gas that has passed through the shift converter. The hydrogen generation apparatus 150 includes a combustor 3 configured to supply the reformer with heat for progressing a reforming reaction between the raw material gas and steam.

In a case where at least the shift converter is provided downstream from the reformer, the third passage 23 is configured to recycle and supply a part of the hydrogen-containing gas that has passed through the shift converter to the raw material gas that is to be supplied to the second desulfurizer 21.

Next, operations of the hydrogen generation apparatus 150 configured as above are described.

In the hydrogen generation apparatus 150 according to the present embodiment, the controller 101 controls the switch 51 such that the raw material gas flows through the first passage 16 in at least one of a pressure compensation operation and a raw material gas purge operation. The pressure compensation operation is an operation of supplying the raw material gas to the reformer 50 in order to compensate for an internal pressure drop that occurs in the reformer 50 after an operation of generating the hydrogen-containing gas is stopped. The raw material gas purge operation is an operation of purging the inside of the reformer 50 with the raw material gas.

Hereinafter, the pressure compensation operation of the hydrogen generation apparatus according to the present embodiment is described in detail.

When the hydrogen generation apparatus 150 stops the operation of generating the hydrogen-containing gas, the temperature of the reformer 50 decreases. A gas passage through which the hydrogen-containing gas generated by the reformer 50 flows and passes through a hydrogen utilization apparatus is provided with a valve. The valve allows a hydrogen generator 1 to be in communication with the atmosphere, or blocks the hydrogen generator 1 from being in communication with the atmosphere. The valve is in a closed state after the hydrogen generation apparatus 150 stops generating the hydrogen-containing gas. Therefore, the internal pressure of the reformer 50 decreases in accordance with a decrease in the temperature of the reformer 50.

Here, the raw material gas is supplied to the reformer 50 so that the internal pressure of the reformer 50 will not become an excessively negative pressure. Specifically, each time a further temperature drop of the reformer 50 occurs, the raw material gas is supplied to the reformer 50 in order to compensate for an internal pressure drop of the reformer 50. At the time of supplying the raw material gas for the pressure compensation, the controller 101 controls the switch 51 such that the raw material gas flows through the first passage 16. Assume a case where the switch 51 is a three-way valve. In such a case, in the hydrogen generation apparatus 150, an on-off valve which is not shown is provided on at least one of the following passages of the first passage 16: a raw material gas passage upstream from the switch 51; and a raw material gas passage downstream from a point where the first passage 16 and the second passage 17 merge together. The controller 101 opens the on-off valve at the time of supplying the raw material gas, and the raw material gas is supplied from the raw material gas source, accordingly. The controller 101 stops the raw material gas supply operation by closing the on-off valve.

As described above, in the pressure compensation operation, the switch is controlled such that the raw material gas flows through the first passage 16. Accordingly, the raw material gas that has been desulfurized by using the first desulfurizer 13 is supplied into the reformer 50. This makes it possible to supply the raw material gas into the reformer 50 without causing degradation of the reforming catalyst due to sulfur compounds. If the second desulfurizer 21 is used at the time of supplying the raw material gas, there is a risk that when the on-off valve 25 is opened, the raw material gas that is undesulfurized flows reversely through the third passage 23 to the reformer 50, the internal pressure of which is a negative pressure. However, such a risk is reduced in the above-described raw material gas supply operation since the desulfurization is performed by using the first desulfurizer 13 and the on-off valve 25 is in a closed state.

Next, the raw material gas purge operation according to the present embodiment is described.

The raw material gas purge operation is an operation of replacing, at least, the inside of the reformer 50 with the raw material gas. It should be noted that if at least one of the shift converter and the CO remover is provided downstream from the reformer 50, it is preferred that the inside of these reactors is also replaced with the raw material gas.

To be specific, when a temperature detected by a temperature detector (not shown) provided for the reformer 50 has been reduced to a predetermined temperature threshold or lower, the controller 101 controls the switch 51 such that the raw material gas flows through the first passage 16. It should be noted that the predetermined temperature threshold is defined as the reformer's temperature that does not cause carbon deposition from the raw material gas. Although it is mentioned above that a timing of starting the raw material gas purge operation is determined based on the temperature of the reformer 50, this is merely an example. The timing of starting the raw material gas purge operation may be determined based on any other criteria.

As described above, in the raw material gas purge operation, the switch is controlled such that the raw material gas flows through the first passage 16. Accordingly, the raw material gas that has been desulfurized by using the first desulfurizer 13 is supplied into the reformer 50. This makes it possible to supply the raw material gas into the reformer 50 without causing degradation of the reforming catalyst due to sulfur compounds. If the second desulfurizer 21 is used to supply the raw material gas, there is a risk that when the on-off valve 25 is opened, the raw material gas that is undesulfurized flows reversely through the third passage 23 to the reformer 50, the internal pressure of which is a negative pressure. However, such a risk is reduced in the above-described raw material gas purge operation since the desulfurization is performed by using the first desulfurizer 13 and the on-off valve 25 is in a closed state.

Embodiment 2

A hydrogen generation apparatus according to Embodiment 2 includes: a reformer configured to generate a hydrogen-containing gas by using a raw material gas; a first desulfurizer configured to remove, through adsorption, a sulfur compound in the raw material gas that is to be supplied to the reformer; a second desulfurizer configured to hydrodesulfurize a sulfur compound in the raw material gas that is to be supplied to the reformer; a first passage through which the raw material gas is supplied to the reformer through the first desulfurizer; a second passage through which the raw material gas is supplied to the reformer through the second desulfurizer, without passing through the first desulfurizer; a switch configured to switch a passage through which the raw material gas flows between the first passage and the second passage; and a controller configured to control the switch such that the raw material gas flows through the first passage in at least one of a pressure compensation operation and a raw material gas purge operation, the pressure compensation operation being an operation of supplying the raw material gas to the reformer in order to compensate for an internal pressure drop that occurs in the reformer after an operation of generating the hydrogen-containing gas is stopped, and the raw material gas purge operation being an operation of purging the inside of the reformer with the raw material gas.

According to the above configuration, in at least one of the pressure compensation operation and the raw material gas purge operation, the raw material gas that is undesulfurized is suppressed from flowing reversely through a recycle line as compared to a case where these operations are performed by always using hydrodesulfurization.

The hydrogen generation apparatus according to Embodiment 2 may include: a first on-off valve provided on the first passage at a position downstream from the first desulfurizer; and a second on-off valve provided on the first passage at a position upstream from the first desulfurizer. The controller may open the second on-off valve before opening the first on-off valve in at least one of the pressure compensation operation and the raw material gas purge.

According to the above configuration, a possibility of adsorbent degradation due to a reverse flow of steam from the inside the reformer to the first desulfurizer can be reduced when the first desulfurizer and the reformer are caused to be in communication with each other.

The hydrogen generation apparatus according to Embodiment 2 may include: a third passage through which the hydrogen-containing gas that is sent out from the hydrogen generation apparatus is supplied to the second desulfurizer; and a third on-off valve provided on the third passage. The controller may close the third on-off valve in at least one of the pressure compensation operation and the raw material gas purge operation.

According to the above configuration, in a case where pressure compensation is performed with the raw material gas by using the second desulfurizer, the following possibility is reduced: the third on-off valve is opened and thereby the raw material gas that is undesulfurized flows reversely through the third passage to the hydrogen generator, the internal pressure of which is a negative pressure.

A fuel cell system according to Embodiment 2 includes: any one of the above-described hydrogen generation apparatuses; and a fuel cell configured to generate electric power by using the hydrogen-containing gas that is supplied from the hydrogen generation apparatus.

A hydrogen generation apparatus operation method according to Embodiment 2 includes: hydrodesulfurizing, by a second desulfurizer, a sulfur compound in a raw material gas that is to be supplied to a reformer; generating, by the reformer, a hydrogen-containing gas by using the raw material gas, the sulfur compound of which has been hydrodesulfurized; performing at least one of a pressure compensation operation and a raw material gas purge operation, the pressure compensation operation being an operation of supplying the raw material gas to the reformer in order to compensate for an internal pressure drop that occurs in the reformer after the generating of the hydrogen-containing gas is stopped, and the raw material gas purge operation being an operation of purging the inside of the reformer with the raw material gas; and removing, through adsorption by a first desulfurizer, a sulfur compound in the raw material gas that is to be supplied to the reformer when performing at least one of the pressure compensation operation and the raw material gas purge operation.

According to the above, in at least one of the pressure compensation operation and the raw material gas purge operation, the raw material gas that is undesulfurized is suppressed from flowing reversely through a recycle line as compared to a case where these operations are performed by always using hydrodesulfurization.

The hydrogen generation apparatus operation method according to Embodiment 2 may include opening a second on-off valve provided on a first passage at a position upstream from the first desulfurizer and opening a first on-off valve provided on the first passage at a position downstream from the first desulfurizer when performing at least one of the pressure compensation operation and the raw material gas purge operation.

According to the above, a possibility of adsorbent degradation due to a reverse flow of steam from the inside the reformer to the first desulfurizer can be reduced when the first desulfurizer and the reformer are caused to be in communication with each other.

The hydrogen generation apparatus operation method according to Embodiment 2 may include closing a third on-off valve provided on a third passage used for supply to the second desulfurizer when performing at least one of the pressure compensation operation and the raw material gas purge operation.

According to the above, in a case where pressure compensation is performed with the raw material gas by using the second desulfurizer, the following possibility is reduced: the third on-off valve is opened and thereby the raw material gas that is undesulfurized flows reversely through the third passage to the hydrogen generator, the internal pressure of which is a negative pressure.

Other than the above-described features, the hydrogen generation apparatus and the fuel cell system according to the present embodiment may be configured in the same manner as the fuel cell system according to Embodiment 1.

Hereinafter, a hydrogen generation apparatus 200 and a fuel cell system 300 including the hydrogen generation apparatus 200, according to Embodiment 2, are described.

Figure 2:
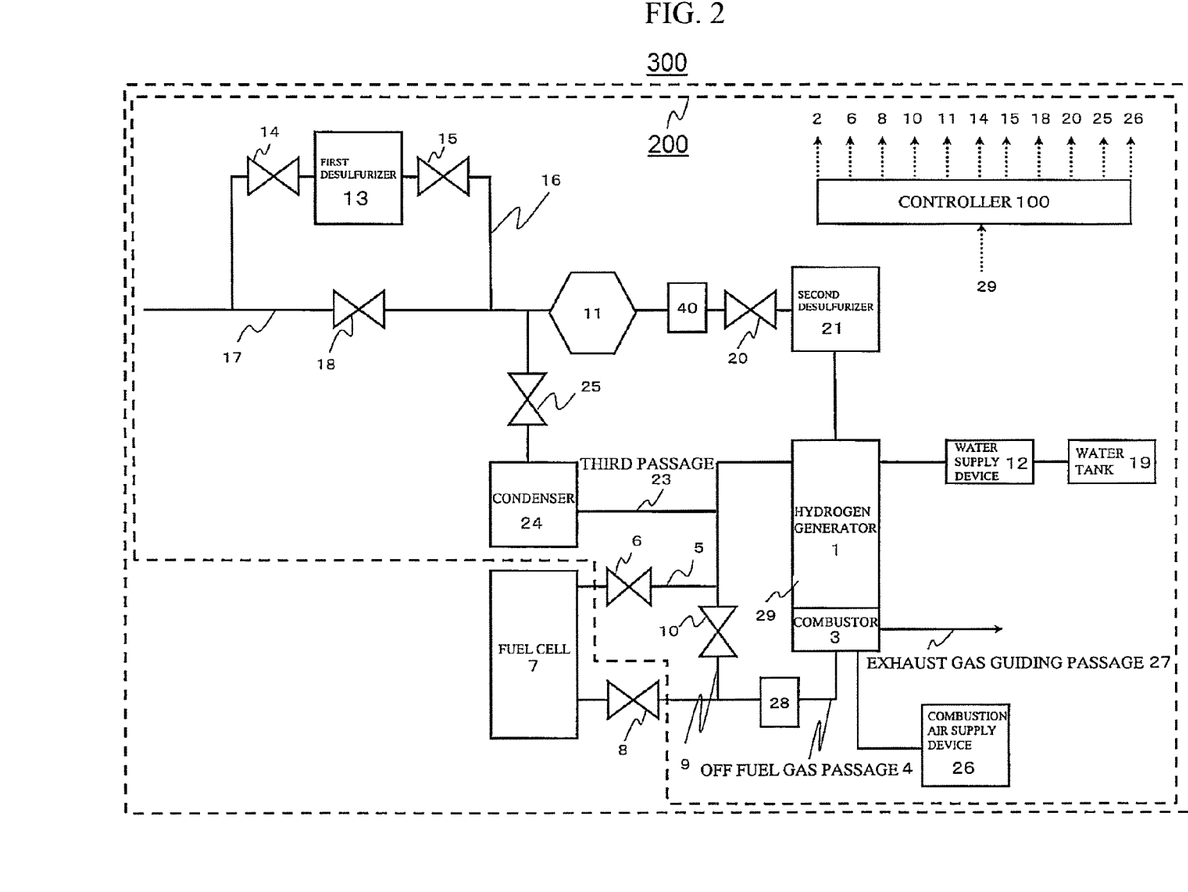
FIG. 2 shows an example of a configuration of a hydrogen generation apparatus according to Embodiment 2.

FIG. 2 shows an example of configurations of the hydrogen generation apparatus 200 and the fuel cell system 300 including the hydrogen generation apparatus 200, according to Embodiment 2. The hydrogen generation apparatus 200 mainly progresses a reforming reaction between steam and a raw material gas, thereby generating a hydrogen-containing gas to be used by, for example, a fuel cell. Here, the raw material gas is, for example, city gas containing methane as a main component, natural gas, or LPG, i.e., a gas containing an organic compound comprised of at least carbon and hydrogen. Such an organic compound is exemplified by a hydrocarbon, for example.

A hydrogen generator 1 includes a reformer (not shown) configured to progress the reforming reaction by using the raw material gas and steam. Although in the present embodiment the hydrogen generator 1 includes only the reformer as a reactor, the hydrogen generator 1 may include not only the reformer but also a shift converter (not shown) and a CO remover (not shown). The shift converter reduces, through a shift reaction, carbon monoxide in the hydrogen-containing gas generated by the reformer, and the CO remover reduces, mainly through an oxidation reaction, carbon monoxide in the hydrogen-containing gas that has passed through the shift converter.

In the case of including the CO remover, the hydrogen generator 1 also includes an air supply device configured to supply air for use in the oxidation reaction to the hydrogen-containing gas that has passed through the shift converter. The hydrogen generator 1 includes a combustor 3 configured to supply the reformer with heat for progressing the reforming reaction between the raw material gas and steam.

A fuel gas supply passage 5, which extends from the hydrogen generator 1, is provided with an on-off valve 6 and is connected to a fuel cell 7. An off fuel gas passage 4 is provided for guiding a fuel gas discharged from the fuel cell 7 into the combustor 3. The off fuel gas passage 4 is provided with an on-off valve 8. Further, a bypass passage 9 is provided as a passage connecting to the off fuel gas passage 4 in a manner to bypasses the fuel cell 7. The bypass passage 9 is provided with an on-off valve 10. It should be noted that the hydrogen generation apparatus 200 and the fuel cell system 300 may be configured without including the on-off valve 6, or may be configured without including the on-off valve 6, the bypass passage 9, and the on-off valve 10.

The hydrogen generation apparatus 200 and the fuel cell system 300 include a raw material gas supply device configured to supply the raw material gas to the hydrogen generator 1 (reformer), and a water supply device 12 configured to supply water to the hydrogen generator 1 (reformer). The raw material gas supply device adjusts the flow rate of the raw material gas supplied to the hydrogen generator 1 (reformer). In the present embodiment, the raw material gas supply device includes a booster 11 (e.g., a booster pump) and a flow rate adjusting valve 40. However, the raw material gas supply device is not limited to this configuration. The raw material gas supply device may be configured as either the booster 11 or the flow rate adjusting valve 40. The water supply device 12 adjusts the flow rate of water supplied to the hydrogen generator 1 (reformer). In the present embodiment, a pump is used as the water supply device 12.

A city gas infrastructure line is used as a source of the raw material gas. The raw material gas supplied from the infrastructure line is supplied to the raw material gas supply device after passing through the first desulfurizer 13 which is packed with a desulfurization agent for use in removing sulfur compounds in the raw material gas through physical adsorption. An on-off valve 14 is disposed upstream from the first desulfurizer 13 and an on-off valve 15 is disposed downstream from the first desulfurizer 13. The raw material gas that has passed through the first desulfurizer 13 is supplied to the hydrogen generator 1 (reformer) through the first passage 16. Examples of the desulfurization agent packed in the first desulfurizer 13 include a zeolite-based adsorbent loaded with ion-exchanged Ag and activated carbon, both of which remove odor component.

The second passage 17 is provided as a passage through which the raw material gas is supplied to the hydrogen generator 1 through the second desulfurizer 21 in a manner to bypass the first desulfurizer 13. The second passage 17 is provided with an on-off valve 18. A water tank 19 is provided as a water source. An on-off valve 20 and the second desulfurizer 21 are disposed downstream from the raw material gas supply device. The hydrogen generator 1 (reformer) is provided on a passage downstream from the on-off valve 20 and the second desulfurizer 21.

The second desulfurizer 21 is packed with a hydrodesulfurization agent. For example, the hydrodesulfurization agent may include: a CoMo-based catalyst for converting sulfur compounds in the raw material gas into hydrogen sulfide; and a ZnO-based catalyst or a CuZn-based catalyst as an adsorbent for adsorbing the converted hydrogen sulfide. Alternatively, the hydrodesulfurization agent may include a Cu—Zn—Ni-based catalyst, or a Cu—Zn—Fe-based catalyst, as a catalyst species having a function of converting sulfur compounds into hydrogen sulfide and a function of adsorbing the hydrogen sulfide. The first passage 16 and the second passage 17 merge together at a point upstream from the raw material gas supply device, and acts as a common raw material gas passage leading to the hydrogen generator 1. It should be noted that the configurations of the first passage 16 and the second passage 17 are not limited to this example. As an alternative example, the first passage 16 and the second passage 17, which branch off from each other, may be separately connected to the hydrogen generator 1 without merging together.

The third passage 23, which branches off from the fuel gas supply passage 5 and extends through a condenser 24 and the on-off valve 25, is connected to a position upstream from the raw material gas supply device. The third passage 23 is configured to recycle a part of the hydrogen-containing gas sent out from the hydrogen generator 1, and to supply the recycle gas to the raw material gas that is to be supplied to the second desulfurizer 21. If the dew point of the recycle gas is high, steam is adsorbed to the hydrodesulfurization agent, resulting in degradation of the desulfurization function of the hydrodesulfurization agent. Therefore, the dew point is lowered by the condenser 24.

A combustion air supply device 26 configured to supply combustion air to the combustor 3 is a blower. The flow rate of the combustion air from the combustion air supply device 26 can be adjusted. Although the combustor includes an ignition device (e.g., an igniter) necessary for an ignition operation and a combustion detector (e.g., a frame rod) configured to detect a combustion state, details of these components are not shown in the drawings since the inclusion of such components is well known art. An exhaust gas generated in the combustor is discharged to the atmosphere through an exhaust gas guiding passage 27.

A condenser 28 is disposed on the off fuel gas passage 4. Lowering the partial pressure of steam in a reformed gas allows an off fuel gas to be combusted in a more stable manner.

The hydrogen generator 1 includes a reformer packed with a reforming catalyst and a first temperature detector 29 for use in detecting the temperature of the reformer. A thermocouple, thermistor, or the like is used as the temperature detector.

The hydrogen generation apparatus 200 and the fuel cell system 300 include a controller 100, to which a detection value is inputted from the first temperature detector 29 and which controls: a supply amount of the raw material gas from the raw material gas supply device; a supply amount of the water from the water supply device 12; the combustion air supply device 26; the on-off valve 6; the on-off valve 8; the on-off valve 10; etc. It should be noted that a semiconductor memory, CPU, and the like are used for the controller 100. The controller 100 is configured to: store, for example, operation information such as an operation sequence of the hydrogen generation apparatus 200 and an accumulated flow amount of the raw material gas; calculate operation conditions suitable for a current status; and instruct components necessary for the system operation, such as the water supply device 12 and the raw material gas supply device, to operate in accordance with the operation conditions.

Described next are operations of the hydrogen generation apparatus 200 and the fuel cell system 300 including the hydrogen generation apparatus 200, according to Embodiment 2.

First, a start-up operation performed by the hydrogen generation apparatus 200 according to Embodiment 2 is described.

In the case of starting up the hydrogen generation apparatus 200 from a stop state, the on-off valves 14, 15, and 20 are opened and the raw material gas supply device is operated when commands are given by the controller 100. As a result, the raw material gas that has passed through the first desulfurizer 13 is supplied to the hydrogen generator 1 (reformer). At the time, a hydrogen-containing gas is not yet produced in the hydrogen generator 1. Therefore, the on-off valve 25 is still in a closed state. The on-off valve 10 is opened with the on-off valve 6 and the on-off valve 8 closed. Accordingly, the raw material gas is discharged from the hydrogen generator 1, and is supplied to the combustor 3 through the fuel gas supply passage 5, the bypass passage 9, the condenser 28, and the off fuel gas passage 4. The raw material gas is used as a fuel in such a manner that the raw material gas is ignited in the combustor 3 together with air from the combustion air supply device 26, and thus a heating operation is started. Then, when the temperature of the hydrogen generator 1 is increased to such a temperature as to allow steam generation from liquid water supplied into the hydrogen generator 1, the water supply device 12 is started and thereby water is supplied into the hydrogen generator 1. Thereafter, the water evaporates into steam within the hydrogen generator 1, and thereby a reforming reaction between the raw material gas and the steam starts in the reformer.

In the hydrogen generation apparatus 200 according to the present embodiment, city gas (13A) containing methane as a main component is used as the raw material gas. The amount of water supply is controlled such that the ratio of the number of molecules of the steam supplied into the reformer to the number of carbon atoms contained in the raw material gas supplied into the reformer is approximately 3 (e.g., approximately 3 in terms of steam/carbon ratio (S/C)). The steam reforming reaction progresses as the reformer in the hydrogen generator 1 is heated up. When the temperature detected by the first temperature detector 29 reaches such a temperature as to allow the hydrogen generator 1 to generate a hydrogen-containing gas of which the hydrogen concentration is stable, the on-off valve 6 and the on-off valve 8 are opened whereas the on-off valve 10 is closed. As a result, the hydrogen-containing gas is supplied to the fuel cell 7 and electric power generation is started. During the power generation operation, the flow rate of the raw material gas supplied to the hydrogen generator 1 by the raw material gas supply device is controlled such that the temperature of the hydrogen generator 1 (reformer) is approximately 650° C.

Next, the on-off valve 25 is opened, and thereby a part of the hydrogen-containing gas discharged from the hydrogen generator 1 is fed to a second passage (in the present embodiment, the second passage is the common passage of the first passage 16 and the second passage 17) through the third passage 23 in a circulating manner. After the circulation is started, the on-off valve 18 is opened, and the on-off valve 14 and the on-off valve 15 are closed. Accordingly, use of the first desulfurizer 13 is stopped and hydrodesulfurization by the second desulfurizer 21 is started. The second desulfurizer 21 is disposed near the hydrogen generator 1 such that the temperature of the second desulfurizer 21 is in a range from 300° C. to 400° C. It should be noted that an electric heater may be further provided around the second desulfurizer 21 to keep the aforementioned temperature.

In the present embodiment, recycling of the hydrogen-containing gas is started after the electric power generation by the fuel cell system 300 is started. However, as an alternative, the recycling of the hydrogen-containing gas generated by the hydrogen generator 1 may be started at the same time as or prior to the start of the electric power generation. In other words, the recycling may be started at any timing, so long as the hydrogen generator 1 is in a state of being able to stably generate a high-concentration hydrogen-containing gas.

Next, a method of stopping the hydrogen generation apparatus 200 and the fuel cell system 300 according to Embodiment 2, and an example of operations performed with the method, are described.

A brief description of the method of stopping the operation of the hydrogen generation apparatus 200 and the fuel cell system 300 is given as follows: the supply of the raw material gas and water is stopped; as a result, the combustion in the combustor 3 is stopped, and thereby the temperature of the reformer in the hydrogen generator 1 decreases and also the internal pressure of the hydrogen generator 1 decreases due to the decrease in the temperature of the reformer; while the internal pressure of the hydrogen generator 1 decreases due to the decrease in the temperature of the reformer, the on-off valve 6, the on-off valve 10, the on-off valve 20, and the on-off valve 25 are closed, and thereby an enclosed space including the reformer is formed for the purpose of blocking the communication between the hydrogen generator 1 and the external air to prevent air from flowing into the hydrogen generator 1. There are cases where the internal pressure of the hydrogen generator 1 decreases to a negative pressure although it depends on the timing of forming the enclosed space and the temperatures of respective component devices. Therefore, the hydrogen generation apparatus 200 according to the present embodiment is configured to perform a pressure compensation operation of supplying the raw material gas to the reformer in order to suppress an internal pressure drop of the hydrogen generator 1 so that an excessively negative pressure will not be caused.

Figure 3:
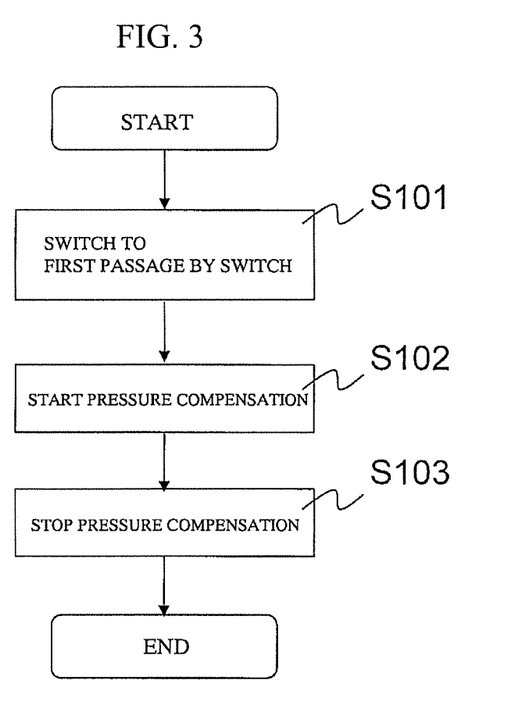
FIG. 3 is a flowchart briefly showing an example of a pressure compensation operation performed by the hydrogen generation apparatus according to Embodiment 2.

Next, operations performed at the time of the pressure compensation operation of the hydrogen generation apparatus 200 according to the present embodiment are briefly described based on a flowchart shown in FIG. 3.

First, prior to the start of the pressure compensation operation performed on the reformer, the controller 100 controls a switch configured to switch a passage through which the raw material gas flows between the first passage 16 and the second passage 17, such that the passage is switched to the first passage 16 (step S101). Next, the pressure compensation operation is started (step S102) to supply the raw material gas into the reformer for pressure compensation, and thereafter, the pressure compensation operation is stopped (step S103). The on-off valve 14, the on-off valve 15, and the on-off valve 18 form the "switch". However, the switch is not limited to this example. The switch may be configured in any manner, so long as the switch is configured to switch the passage between the first passage 16 and the second passage 17. For example, the switch may include either the on-off valve 14 or the on-off valve 15, or may include a three-way valve at a position where the first passage 16 branches off from the second passage 17.

Figure 4:
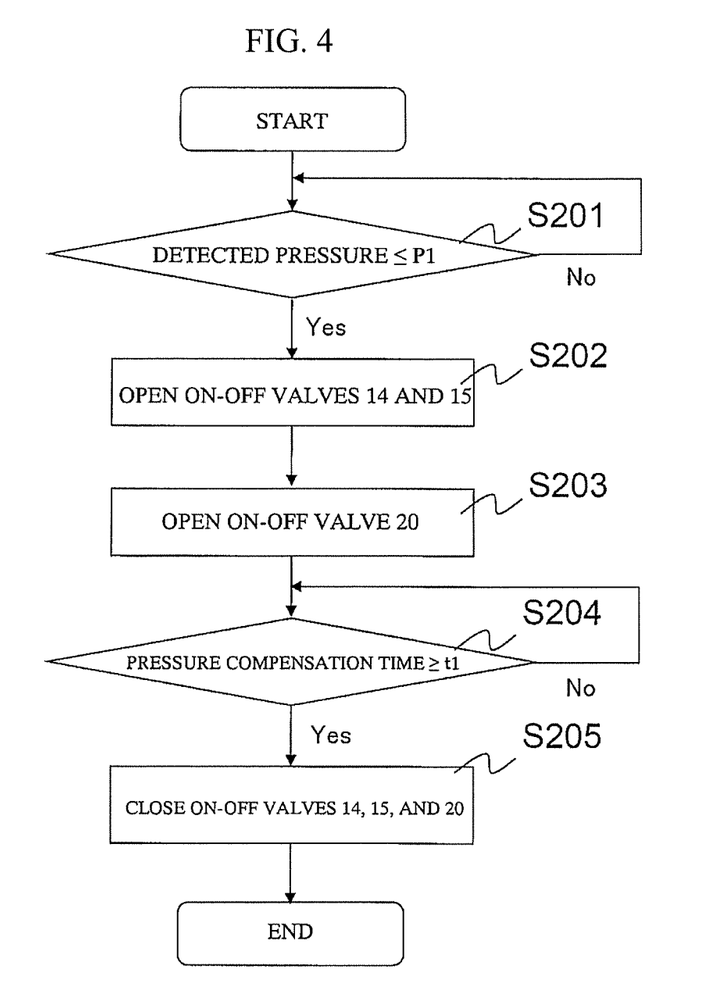
FIG. 4 is a flowchart showing in detail the example of the pressure compensation operation performed by the hydrogen generation apparatus according to Embodiment 2.

Next, the pressure compensation operation is described in detail based on a flowchart shown in FIG. 4. First, it is determined whether a pressure detected by a pressure detector (not shown) configured to detect the internal pressure of the reformer is a predetermined pressure threshold P1 or lower (step S201). If the detected pressure is the predetermined pressure threshold P1 or lower, the on-off valve 14 and the on-off valve 15 are opened, and thereby the passage is switched to the first passage 16 (step S202). Then, the on-off valve 20 is opened, so that the raw material gas at a predetermined supply pressure is supplied to the reformer for pressure compensation (step S203). It is determined whether a time over which the raw material gas is supplied to the reformer (i.e., a pressure compensation time) has reached a predetermined time threshold t1 (step S204). If the pressure compensation time has reached or exceeded the predetermined time threshold t1 (Yes in step S204), the controller 100 closes the on-off valve 14, the on-off valve 15, and the on-off valve 20, and thus the pressure compensation operation is stopped (step S205).

In the above-described flow, the predetermined pressure threshold P1 is a value less than the supply pressure of the raw material gas. In the above-described pressure compensation operation, the first passage 16 is simply opened for supplying the raw material gas to the reformer. However, the booster 11 may also be controlled to operate so as to supply higher pressure to the reformer for pressure compensation. In the pressure compensation operation, if the hydrogen generation apparatus 200 does not include the on-off valve 6, or does not include the on-off valve 6, the bypass passage 9, and the on-off valve 10, then the pressure of the hydrogen generator 1 and the pressure of the fuel cell 7 are compensated for at the same time.

In the above-described flow, the pressure detector detects an internal pressure drop of the reformer. However, the internal pressure of the reformer need not be directly detected. As an alternative, the internal pressure of the reformer may be indirectly detected based on a temperature detected by the first temperature detector 29, or based on a time elapsed after the enclosed space including the reformer is formed.

As described above, in the pressure compensation operation, the switch is controlled such that the passage through which the raw material gas flows is switched to the first passage 16. Accordingly, the internal pressure of the reformer is compensated for by the raw material gas that has been desulfurized by using the first desulfurizer 13. This makes it possible to perform the pressure compensation using the raw material gas without causing degradation of the reforming catalyst due to sulfur compounds. If the second desulfurizer 21 is used to perform the pressure compensation using the raw material gas, there is a risk that when the on-off valve 25 is opened, the raw material gas that is undesulfurized flows reversely through the third passage 23 to the hydrogen generator 1, the internal pressure of which is a negative pressure. However, such a risk is reduced in the above-described pressure compensation operation since the desulfurization is performed by using the first desulfurizer 13 and the on-off valve 25 is in a closed state.

The hydrogen generation apparatus 200 according to the present embodiment is configured such that when stopping operating, the hydrogen generation apparatus 200 stops the supply of the raw material gas and water, stops the combustion by the combustor 3, and closes the on-off valves 6, 10, 20, and 25 to form an enclosed space including the reformer for the purpose of blocking the communication between the hydrogen generator 1 and the external air to prevent air from flowing into the hydrogen generator 1. Then, after a temperature drop of the hydrogen generator 1 has occurred, the hydrogen generation apparatus 200 performs a raw material gas purge operation of purging the inside of the reformer with the raw material gas.

Figure 5:
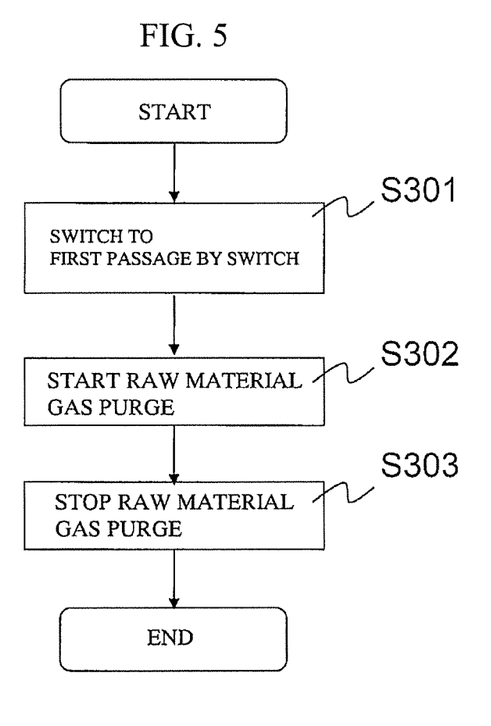
FIG. 5 is a flowchart briefly showing an example of a raw material gas purge operation performed by the hydrogen generation apparatus according to Embodiment 2.

Next, operations performed at the time of the raw material gas purge operation of the hydrogen generation apparatus 200 according to the present embodiment are briefly described based on a flowchart shown in FIG. 5.

First, prior to the start of the raw material gas purge operation performed on the reformer, the controller 100 controls the switch configured to switch a passage through which the raw material gas flows between the first passage 16 and the second passage 17, such that the passage is switched to the first passage 16 (step S301). Next, the raw material gas purge operation is started (step S302) to purge the inside of the reformer with the raw material gas, and thereafter, the raw material gas purge operation is stopped (step S303).

Figure 6:
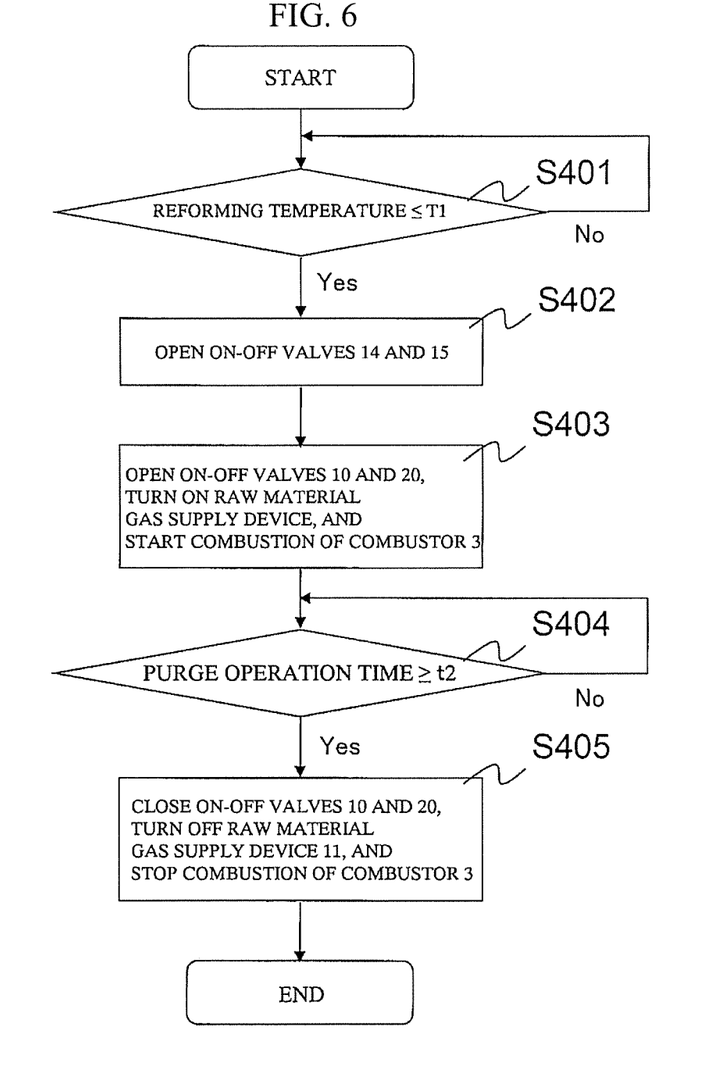
FIG. 6 is a flowchart showing in detail the example of the raw material gas purge operation performed by the hydrogen generation apparatus according to Embodiment 2.

Next, operations performed at the time of the raw material gas purge operation are described in detail based on a flowchart shown in FIG. 6. First, it is determined whether a temperature detected by the first temperature detector 29 configured to detect the temperature of the reformer is a predetermined temperature threshold T1 or lower (step S401). If the detected temperature is the predetermined temperature threshold T1 or lower, the on-off valve 14 and the on-off valve 15 are opened, and thereby the passage is switched to the first passage 16 (step S402). Then, the on-off valve 10 and the on-off valve 20 are opened, and the operation of the raw material supply device is started (in the present embodiment, the operation of the booster 11 is started and the flow rate adjusting valve 40 is opened), and also, the operation of the combustion air supply device 26 and the operation of the ignition device are started (step S403). As a result, the inside of the reformer is purged with the raw material gas, and a combustible gas containing the raw material gas that is discharged from the hydrogen generator 1 is combusted by the combustor 3. Then, it is determined whether a time over which the raw material gas is supplied to the reformer (i.e., a purge operation time) has reached a predetermined time threshold t2 (step S404). If the purge operation time has reached or exceeded the predetermined time threshold t2 (Yes in S404), the controller 100 closes the on-off valves 14, 15 and the on-off valves 10, 20, and stops the supply of the raw material gas to the reformer and the combustion operation of the combustor 3. After a residual gas in the combustor 3 is purged with the combustion air, the operation of the combustion air supply device 26 is stopped, and thus the raw material gas purge operation is stopped (step S405).

It should be noted that in the above-described flow, the predetermined temperature threshold T1 is defined as the reformer's temperature that does not cause carbon deposition from the raw material gas, and the predetermined time threshold t2 is defined as a time over which at least the inside of the reformer is purged with the raw material gas.

In the above-described raw material gas purge operation, a gas in the hydrogen generator 1 is replaced with the raw material gas. However, as an alternative, a gas in the hydrogen generator 1 and a gas in the fuel cell 7 may be both replaced with the raw material gas. In such a case, in step S403, the controller 100 opens the on-off valve 6 and the on-off valve 8 instead of the on-off valve 10. In this case, even if the on-off valve 6, the on-off valve 10, and the bypass passage 9 are not provided, a gas in the hydrogen generator 1 and a gas in the fuel cell 7 are both replaced with the raw material gas.

As described above, in the raw material gas purge operation, the switch is controlled such that the passage through which the raw material gas flows is switched to the first passage 16. Accordingly, the inside of the reformer is purged with the raw material gas that has been desulfurized by using the first desulfurizer 13. This makes is possible to perform purging with the raw material gas without causing degradation of the reforming catalyst due to sulfur compounds. If the second desulfurizer 21 is used to perform the raw material gas purge operation, there is a risk that when the on-off valve 25 is opened, the raw material gas that is undesulfurized flows reversely through the third passage 23 to the hydrogen generator 1, the internal pressure of which is a negative pressure. However, such a risk is reduced in the above-described raw material gas purge operation since the desulfurization is performed by using the first desulfurizer 13 and the on-off valve 25 is in a closed state.

The hydrogen generation apparatus 200 according to the present embodiment as described above is configured to perform both the pressure compensation operation and the raw material gas purge operation when stopping operating. However, the hydrogen generation apparatus 200 may be configured to perform either the pressure compensation operation or the raw material gas purge operation when stopping operating.

It should be noted that the hydrogen generation apparatus 200 according to the present embodiment is configured such that in at least one of the pressure compensation operation and the raw material gas purge operation, the raw material gas passage is switched to the first passage 16 by means of the switch, i.e., the on-off valve 14 and the on-off valve 15 are opened, and then the on-off valve 20 is opened. The reason for this is as follows. In a case where the first desulfurizer 13 and the reformer are caused to be in communication with each other, there is a possibility that if the internal pressure of the reformer is high, steam in the reformer flows reversely to the first desulfurizer 13 and causes adsorbent degradation. This possibility can be reduced by applying the supply pressure of the raw material gas to the first desulfurizer 13 before the downstream from the first desulfurizer 13 is caused to be in communication with the reformer. The above operation, however, is merely an example. Such an operation may be performed in any manner, so long as the supply pressure of the raw material gas can be applied to the first desulfurizer 13 by opening an on-off valve upstream from the first desulfurizer 13 prior to a step of opening an on-off valve to cause the first desulfurizer 13 and the reformer to be in communication with each other. Examples of such an operation include: an operation in which the on-off valve 14 is opened before the on-off valve 20 and the on-off valve 15 are opened; and an operation in which the on-off valve 14 and the on-off valve 20 are opened before the on-off valve 15 is opened. It should be noted that the operation of applying the supply pressure of the raw material to the first desulfurizer 13 by opening an on-off valve upstream from the first desulfurizer 13 prior to a step of opening an on-off valve to cause the first desulfurizer 13 and the reformer to be in communication with each other, is not essential. The operations that the hydrogen generation apparatus 200 is configured to perform need not include such an operation.

The hydrogen generation apparatus 200 according to the present embodiment includes the on-off valve 15 and the on-off valve 20 downstream from the first desulfurizer 13. However, as an alternative, the hydrogen generation apparatus 200 may include either the on-off valve 15 or the on-off valve 20 downstream from the first desulfurizer 13. In such a case, an operation of opening the on-off valve 14 while either the on-off valve 15 or the on-off valve 20 downstream from the first desulfurizer 13 is in a closed state may be performed as the aforementioned operation where the supply pressure of the raw material gas is applied to the first desulfurizer 13 by opening an on-off valve upstream from the first desulfurizer 13 prior to a step of opening an on-off valve to cause the first desulfurizer 13 and the reformer to be in communication with each other.

Embodiment 3

A fuel cell system according to Embodiment 3 is an example, in which at least one of the hydrogen generation apparatus described in Embodiment 1 and the hydrogen generation apparatus described in Embodiment 2 is applied in a solid oxide fuel cell system.

Figure 7:
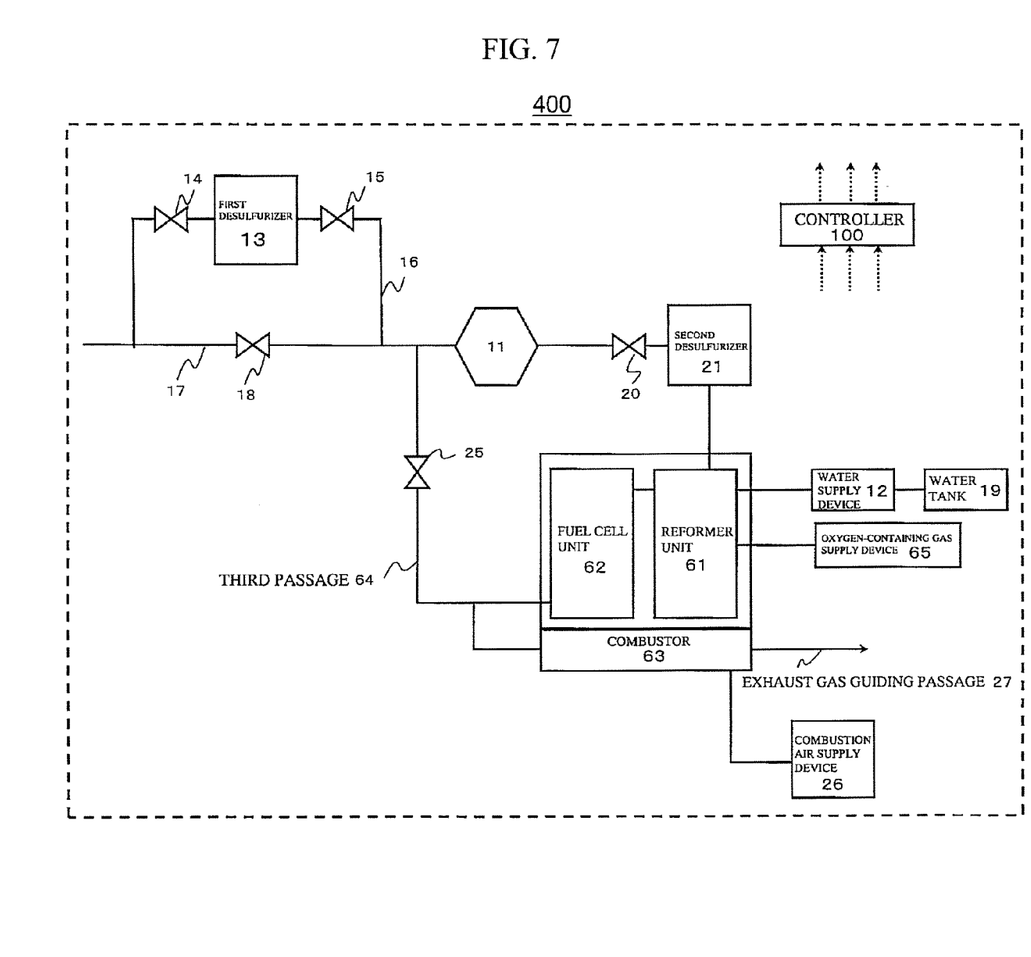
FIG. 7 is a block diagram showing an example of a schematic configuration of a fuel cell system according to Embodiment 3.

FIG. 7 is a block diagram showing an example of a schematic configuration of the fuel cell system according to Embodiment 3. A sold oxide fuel cell (SOFC) of an indirect internal reforming type is used in the fuel cell system according to Embodiment 3.

In a fuel cell system 400 according to Embodiment 3, a reformer unit 61 and a fuel cell unit 62 are integrated, and are heated up by a combustor 63. The water supply device 12 supplies water to the reformer unit 61. The raw material gas that is discharged from the second desulfurizer 21 is supplied to the reformer unit 61. An oxygen-containing gas supply device 65 supplies an oxygen-containing gas (e.g., air) to the reformer unit 61.

The reformer unit 61 acts as a hydrogen generation apparatus configured to generate a hydrogen-containing gas by using the raw material gas. The hydrogen-containing gas sent out from the reformer unit 61 is discharged from the fuel cell unit 62. A part of the hydrogen-containing gas discharged from the fuel cell unit 62 (i.e., an off gas) is fed through a third passage 64 to the second passage 17 at a position upstream from the raw material gas supply device.

In Embodiment 3, components that are not described above but are denoted by the same reference signs and names as those used in FIG. 2 are configured in the same manner as in the fuel cell system 300 according to Embodiment 2. Therefore, a description of such components is omitted.

The fuel cell system according to Embodiment 3 may be configured to operate in the same manner as at least one of the hydrogen generation apparatus according to Embodiment 1 and the fuel cell system according to Embodiment 2.

Specifically, for example, the controller 100 controls the switch such that the raw material gas flows through the first passage 16 in at least one of the pressure compensation operation and the raw material gas purge operation. The pressure compensation operation is an operation of supplying the raw material gas in order to compensate for an internal pressure drop that occurs in the reformer unit 61 and in the fuel cell unit 62 after the operation of generating the hydrogen-containing gas is stopped. The raw material gas purge operation is an operation of purging the inside of the reformer unit 61 and the fuel cell unit 62 with the raw material gas.

In at least one of the pressure compensation operation and the raw material gas purge, the controller may open the on-off valve 14 before opening the on-off valve 15.

In at least one of the pressure compensation operation and the raw material gas purge, the controller 100 may open the on-off valve 18 before opening the on-off valve 25.

In at least one of the pressure compensation operation and the raw material gas purge operation, the controller 100 may close the on-off valve 25.

INDUSTRIAL APPLICABILITY

The hydrogen generation apparatus, the fuel cell system, and the hydrogen generation apparatus operation method according to the present invention are useful as a fuel cell system and the like since the hydrogen generation apparatus, the fuel cell system, and the hydrogen generation apparatus operation method suppress an undesulfurized raw material gas from flowing into a reformer reversely through a recycle line at the time of performing pressure compensation or raw material gas purge.

REFERENCE SIGNS LIST 1 hydrogen generator
3 combustor
4 off fuel gas passage
5 fuel gas supply passage
6 on-off valve
7 fuel cell
8 on-off valve
9 bypass passage
10 on-off valve
11 booster
12 water supply device
13 first desulfurizer
14 on-off valve
15 on-off valve
16 first passage
17 second passage
18 on-off valve
19 water tank
20 on-off valve
21 second desulfurizer
23 third passage
24 condenser
25 on-off valve
26 combustion air supply device
27 exhaust gas guiding passage
28 condenser
29 first temperature detector
35 second temperature detector
40 flow rate adjusting valve
50 reformer
51 switch
61 reformer unit 62 fuel cell unit
63 combustor
64 third passage
65 oxygen-containing gas supply device
100 controller
101 controller
150 hydrogen generation apparatus
200 hydrogen generation apparatus
300 fuel cell system
400 fuel cell system

The invention claimed is:

1. A hydrogen generation apparatus comprising:
a reformer operative to generate a hydrogen-containing gas by using a raw material gas;
a first desulfurizer operative to remove, through adsorption, a sulfur compound in the raw material gas that is to be supplied to the reformer;
a second desulfurizer operative to hydrodesulfurize a sulfur compound in the raw material gas that is to be supplied to the reformer;
a first passage through which the raw material gas is supplied to the reformer through the first desulfurizer;
a second passage through which the raw material gas is supplied to the reformer through the second desulfurizer, without passing through the first desulfurizer;
a switch operative to switch a passage through which the raw material gas flows between the first passage and the second passage; and
a controller including processing circuitry and a memory storing a program,
wherein the program, when executed by the processing circuitry, causes the controller to control the switch such that the raw material gas flows through the first passage in at least one operation selected the group consisting of a pressure compensation operation and a raw material gas purge operation, the pressure compensation operation being an operation of supplying the raw material gas to the reformer in order to compensate for an internal pressure drop that occurs in the reformer after an operation of generating the hydrogen-containing gas is stopped, and the raw material gas purge operation being an operation of purging the inside of the reformer with the raw material gas.

2. The hydrogen generation apparatus according to claim 1, comprising:
a first on-off valve provided on the first passage at a position downstream from the first desulfurizer; and
a second on-off valve provided on the first passage at a position upstream from the first desulfurizer, wherein
the controller opens the second on-off valve before opening the first on-off valve in at least one operation selected from the group consisting of the pressure compensation operation and the raw material gas purge operation.

3. The hydrogen generation apparatus according to claim 1, comprising:
a third passage through which the hydrogen-containing gas that is sent out from the hydrogen generation apparatus is supplied to the second desulfurizer; and
a third on-off valve provided on the third passage, wherein the controller closes the third on-off valve in at least one operation selected from the group consisting of the pressure compensation operation and the raw material gas purge operation.

4. A fuel cell system comprising:
the hydrogen generation apparatus according to claim 1; and
a fuel cell operative to generate electric power by using the hydrogen-containing gas that is supplied from the hydrogen generation apparatus.

5. An operation method of a hydrogen generation apparatus, the operation method comprising:
hydrodesulfurizing, by a second desulfurizer, a sulfur compound in a raw material gas that is to be supplied to a reformer;
generating, by the reformer, a hydrogen-containing gas by using the raw material gas, the sulfur compound of which has been hydrodesulfurized;
performing at least one operation selected from the group consisting of a pressure compensation operation and a raw material gas purge operation, the pressure compensation operation being an operation of supplying the raw material gas to the reformer in order to compensate for an internal pressure drop that occurs in the reformer after the generating of the hydrogen-containing gas is stopped, and the raw material gas purge operation being an operation of purging the inside of the reformer with the raw material gas; and
removing, through adsorption by a first desulfurizer, a sulfur compound in the raw material gas that is to be supplied to the reformer when performing at least one operation selected from the group consisting of the pressure compensation operation and the raw material gas purge operation.

6. The operation method according to claim 5, comprising opening a second on-off valve provided on a first passage at a position upstream from the first desulfurizer and opening a first on-off valve provided on the first passage at a position downstream from the first desulfurizer when performing at least one operation selected from the group consisting of the pressure compensation operation and the raw material gas purge operation.

7. The operation method according to claim 5, comprising closing a third on-off valve provided on a third passage used for supply to the second desulfurizer when performing at least one operation selected from the group consisting of the pressure compensation operation and the raw material gas purge operation.

8. A fuel cell system comprising:
the hydrogen generation apparatus according to claim 2; and
a fuel cell operative to generate electric power by using the hydrogen-containing gas that is supplied from the hydrogen generation apparatus.

9. A fuel cell system comprising:
the hydrogen generation apparatus according to claim 3; and
a fuel cell operative to generate electric power by using the hydrogen-containing gas that is supplied from the hydrogen generation apparatus.

* * * * *